US006459603B1

(12) United States Patent
Malik et al.

(10) Patent No.: US 6,459,603 B1
(45) Date of Patent: Oct. 1, 2002

(54) ADAPTER CIRCUIT FOR SELECTIVELY DOUBLING INPUT VOLTAGE DEPENDING UPON CONNECTOR TYPE

(75) Inventors: Randhir Singh Malik, Cary; William Hemena, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/824,616

(22) Filed: Apr. 2, 2001

(51) Int. Cl.[7] .............................................. H02M 1/10
(52) U.S. Cl. ...................................... 363/142; 363/16
(58) Field of Search ................................ 363/142, 143, 363/24, 25, 26, 15, 16

(56) References Cited

U.S. PATENT DOCUMENTS

| | | |
|---|---|---|
| 3,723,850 A | 3/1973 | Daniels et al. |
| 4,626,981 A | 12/1986 | Su et al. |
| 4,903,181 A * | 2/1990 | Seidel ........................ 323/210 |
| 4,937,731 A * | 6/1990 | Konopka .................... 323/301 |
| 5,118,301 A | 6/1992 | Bentivolio |
| 5,119,283 A * | 6/1992 | Steigerwald et al. ........ 323/207 |
| 5,661,348 A | 8/1997 | Brown |

OTHER PUBLICATIONS

IBM Technical Disclosure Bulletin; vol. 31, No. 6, Nov. 1988; Constant Power Fusing Arrangement for 110/220–Volt Power Supplies pp. 57–58.
IBM Technical Disclosure Bulletin; vol. 32, No. 6B, Nov. 1989; Power Supply Universal Front End pp. 155–156.

* cited by examiner

Primary Examiner—Shawn Riley
(74) Attorney, Agent, or Firm—J. Bruce Schelkopf; Joseph A. Sawyer, Jr.

(57) ABSTRACT

An adapter circuit in power supplies utilizes a selective voltage doubler which approximately doubles an input voltage with a low line connector and does not with a high line connector. The selective voltage doubler is coupled to a switcher, which in turn is coupled to a resonant circuit. The resonant circuit is coupled to a first diode and a second diode and a filter. When a low line connector is used, the input voltage is doubled and a one diode drop is used. When a high line connector is used, the input voltage is not doubled and a two diode drop is used.

20 Claims, 3 Drawing Sheets

US 6,459,603 B1

ADAPTER CIRCUIT FOR SELECTIVELY DOUBLING INPUT VOLTAGE DEPENDING UPON CONNECTOR TYPE

FIELD OF THE INVENTION

The present invention relates to power supplies, and more particularly to AC/DC adapter circuits in power supplies.

BACKGROUND OF THE INVENTION

The voltage of the alternating current (AC) sources from typical outlets vary from country to country, mostly between 90V and 265V. The alternating current/direct current (AC/DC) adapters for laptop computer power supplies and for batteries of most mobile products need to be compatible for these various AC sources.

FIG. 1 is a circuit diagram illustrating a conventional AC/DC adapter. This circuit 100 is compatible with AC sources ranging from 90V to 265V. The circuit 100 comprises a rectifier bridge 104 which fully rectifies the AC voltage input from the AC source 102. The AC voltage from the rectifier bridge 104 charges the input capacitor C1 106, developing a DC voltage. Thus, the DDC voltage across C1 106 can vary from a low 100V DC to a high 375V DC. The transformer T9 108 is a flyback transformer that stores the energy when transistor Q2 110 is "on ", and releases the energy to the output when Q2 110 is "off". The DC output voltage is filtered by diode D8 112 and capacitor C5 114. The DC output voltage is regulated by an error amplifier 116, which changes the pulse width of the switcher using the pulse width modulator 118 (PWM).

However, because T9 108 is a storage transformer, its size is large. Since Q2 110 is a high current, high voltage transistor required for wide range of input voltage, its size is large. In addition, due to the very wide range of AC input voltage, the circuit 100 cannot operate at a very high frequency, i.e., greater than 150 KHz. For these reasons, the size of the circuit 100 is very large. Due to its large size and its requirement to accommodate a wide range of AC input voltages, the circuit 100 is inefficient.

Accordingly, there exists a need for an adapter circuit which improves efficiency and size. The present invention addresses such a need.

SUMMARY OF THE INVENTION

The present invention provides an adapter circuit which improves efficiency and size. The adapter circuit includes: a selective voltage doubler which approximately doubles an input voltage with a low line connector and does not with a high line connector; a switcher coupled to the selective voltage doubler; a resonant circuit coupled to the switcher; a first diode and a second diode coupled to the resonant circuit; and a filter coupled to the first and second diodes. When a low line connector is used, the input voltage is doubled and a one diode drop is used. When a high line connector is used, the input voltage is not doubled and a two diode drop is used. This allows the adapter circuit to be significantly reduced in size and weight. It also has low power loss.

DETAILED DESCRIPTION

The present invention provides an adapter circuit which improves efficiency and size. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 and 3 in conjunction with the discussion below.

Figure 1:
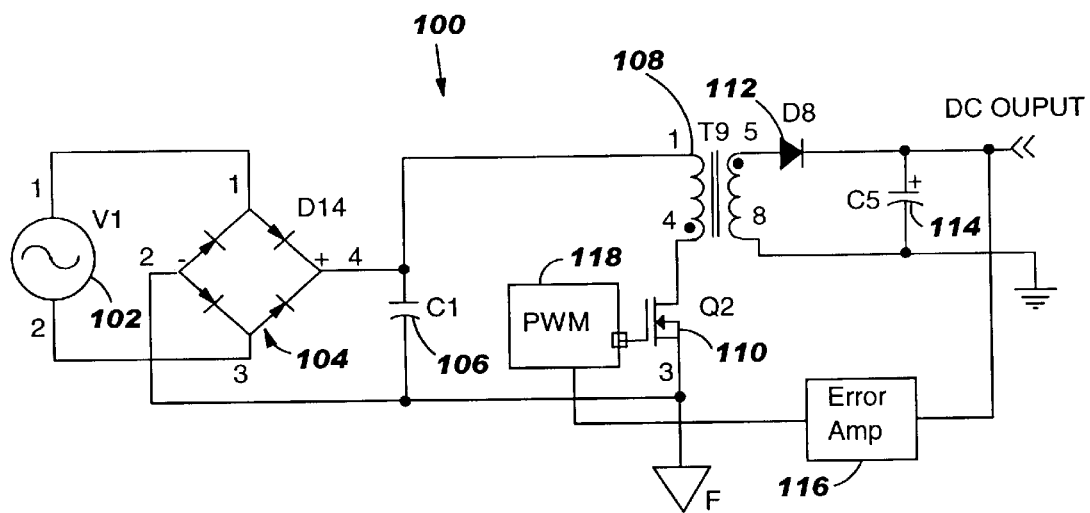
FIG. 1 is a circuit diagram illustrating a conventional AC/DC adapter.
Figure 2:
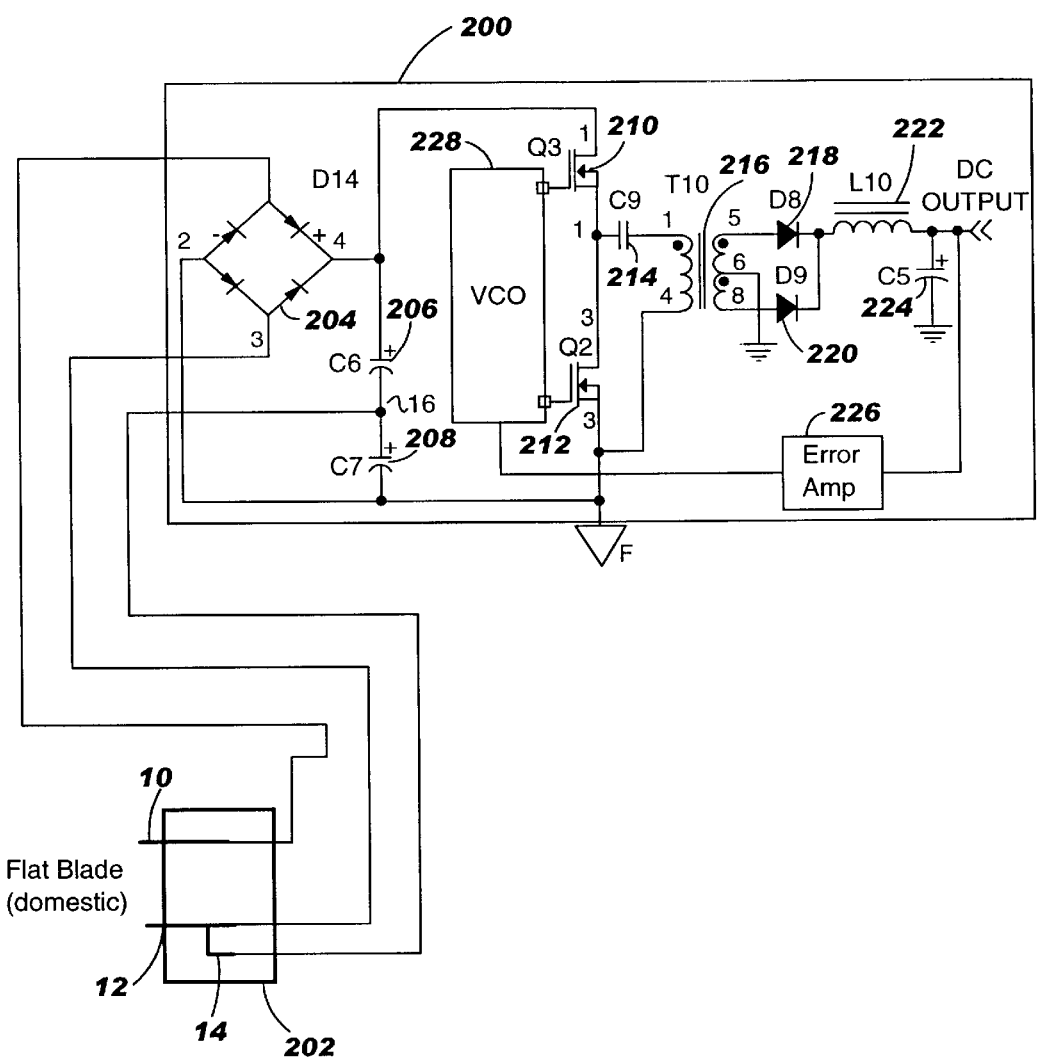
FIG. 2 is a circuit diagram illustrating a preferred embodiment of an adapter circuit in accordance with the present invention.

FIG. 2 is a circuit diagram illustrating a preferred embodiment of an adapter circuit in accordance with the present invention. The adapter circuit 200 may be used with different connectors, depending upon the AC voltage level used by a particular country. FIG. 2 illustrates the circuit 200 with a low line type of connector 202 which may by used in the United States, where the AC voltage is approximately 100V. The connector 202 has a first blade 10, a second blade 12, and a third blade 14 connected to the second blade 12. The first 10 and second 12 blades are connected to the half-wave rectifier D14 204 as illustrated. The third blade 14 is connected to the node 16 where capacitor C6 206 and capacitor C7 208 join. The rectifier D14 204, C6 206, and C7 208 form the selective voltage doubler of the circuit 200.

During the positive half of the high frequency AC cycle, the first blade 10 is positive, and the second blade 12 is negative. The current passes through D14 204 and charges C6 206. During the negative half of the high frequency AC cycle, the first blade 10 is negative, and the second blade 12 is positive. The current passes through D14 204, and charges C7 208. The positive terminal of C6 206 is connected to the drain of transistor Q3 210. The negative terminal C7 208 is connected to the source of transistor Q2 212. Q3 210 and Q2 212 form the switcher of the circuit 200. Because the third blade 14 is connected to the second blade 12, the total voltage applied to the input of the switcher is the sum of the voltages across C6 206 and C7 208. Thus, the voltage to the switcher is approximately doubled. For example, if the AC source is 100V AC, then the voltages across C6 206 and C7 208 are approximately 140V DC each, thus providing the switcher with approximately 280V DC. Because about twice the input voltage is powering the switcher, the current flowing out of C6 206 and C7 208 is reduced to half. Thus, Q2 212 and Q3 210 may be smaller than the transistor Q2 110 in the circuit 100.

During the positive half of the high frequency AC cycle, C6 206 is charged, Q2 is "off ", and Q3 210 turns "on ". The voltage passes through capacitor C9 214 to the primary winding of the transformer T10 216. The capacitor C9 214 and the leakage inductance of T10 216 form the resonant circuit of the circuit 200. The secondary winding of T10 216 is coupled to the diode D8 218 and the diode D9 220. During the positive half of the high frequency AC cycle, D8 218 conducts. During the negative half of the high frequency AC cycle, C7 208 is charged, Q2 turns "on ", and Q3 210 is "off ". The voltage passes through the primary and secondary windings of T10 216, and D9 220 conducts. Thus, the charging of C6 206 and C7 208 is accomplished with one diode drop, rather than two as with circuit 100. Since the voltages applied across the diodes D8 218 and D9 220 are approximately twice the output voltage, low power dissipation diodes may be used. The inductor L10 222 and the capacitor C5 224 form the filter of the circuit 200 which filters the DC voltage output.

The circuit 200 is a high frequency converter, in the order of 1 MHz, and is a resonant circuit which operators in the full range of AC voltage sources. Thus, the size of L10 222 can be much smaller than the T9 108 of circuit 100. Also, since C5 224 will not experience any significant ripple, C5 224 may be smaller than C5 114 of circuit 100. Therefore, the circuit 200 is smaller in size and has less power loss than conventional adapter circuits.

The DC output voltage is regulated by the error amplifier 226, which uses the voltage control oscillator 228 (VCO) to change the DC output voltage.

Figure 3:
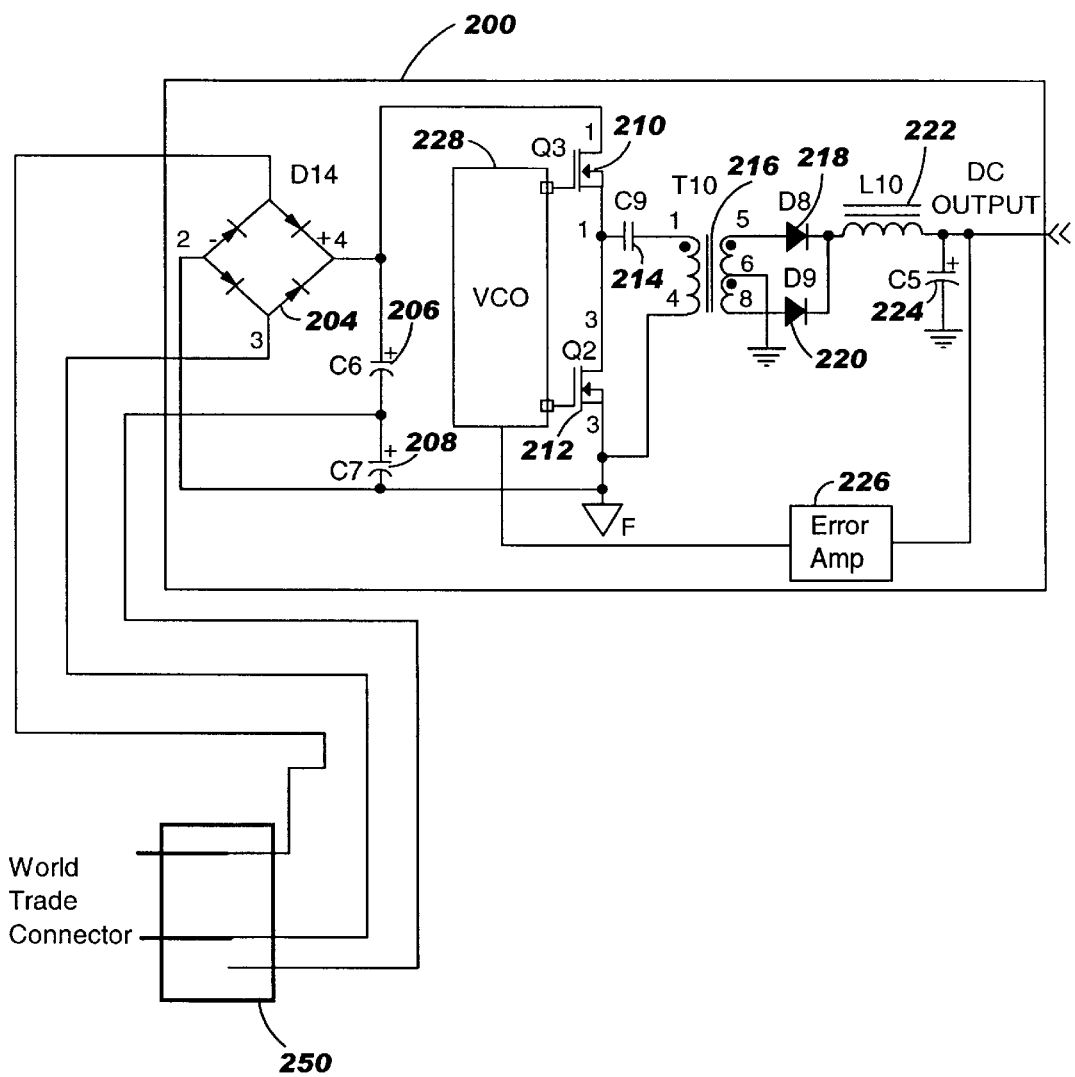
FIG. 3 is a circuit diagram illustrating the preferred embodiment of the adapter circuit in accordance with the present invention with a second type of connector

FIG. 3 is a circuit diagram illustrating the preferred embodiment of the adapter circuit in accordance with the present invention with a high line type of connector, which may by used in Europe, where the input AC voltage is approximately 200V. Like the connector 202, the connector 250 also has a first blade 10, a second blade 12, and a third blade 14. However, the third blade 14 is not connected to the second blade 14.

During the positive half of the high frequency AC cycle, the first blade 10 is positive, and the second blade 12 is negative. The current passes through D14 204 and charges both C6 206 and C7 208. Since the neutral blade 14 is not connected to the second blade 12, C6 206 and C7 208 are now is series. The entire 200V AC input is rectified by D14 204, and thus the DC voltage across C6 206 and C7 208 is approximately 280V DC and is not doubled. The same is true for the negative half of the high frequency AC cycle. Thus, approximately the same amount of DC voltage is provided to the switching means by using the appropriate connector 202 or 250. The remaining circuit functions in the same manner as with connector 202.

An adapter circuit which improves efficiency and size has been disclosed. The adapter circuit selectively doubles the input voltage depending upon the type of connector used with the circuit. When a low line connector is used, the input voltage is doubled and a one diode drop is used. When a high line connector is used, the input voltage is not doubled and a two diode drop is used. This allows the adapter circuit to be significantly reduced in size and weight. It also has low power loss.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An adapter circuit, comprising:
   (a) a selective voltage doubler, wherein the selective voltage doubler approximately doubles an input voltage with a low line connector and does not double the input voltage with a high line connector;
   (b) a switcher coupled to the selective voltage doubler;
   (c) a resonant circuit coupled to the switcher, wherein the resonant circuit comprises:
      (c1) a third capacitor coupled to a source of a first transistor of the switcher and to a drain of a second transistor of the switcher, and
      (c2) a transformer, wherein a primary winding of the transformer is coupled to the third capacitor and a source of the second transistor, wherein a secondary winding of the transformer is coupled to the first and second diodes;
   (d) a first diode and a second diode coupled to the resonant circuit; and
   (e) a filter coupled to the first and second diodes.

2. The circuit of claim 1, wherein the selective voltage doubler (a) comprises:
   (a1) a half-wave rectifier coupled to a first blade and a second blade of the low line connector or the high line connector;
   (a2) a first capacitor, wherein a positive terminal of the first capacitor is coupled to the half-wave rectifier and a negative terminal of the first capacitor is coupled to a third blade of the low line connector or the high line connector, wherein the third blade is coupled to the second blade in the low line connector and not coupled to the second blade in the high line connector; and
   (a3) a second capacitor, wherein a positive terminal of the second capacitor is coupled to the negative terminal of the first capacitor and a negative terminal of the second capacitor is coupled to ground.

3. The circuit of claim 1, wherein the switcher (b) comprises:
   (b1) a first transistor, wherein a drain of the first transistor is coupled to a positive terminal of a first capacitor of the selective voltage doubler; and
   (b2) a second transistor, wherein a drain of the second transistor is coupled to a source of the first transistor and a source of the second transistor is coupled to a negative terminal of a second capacitor of the selective voltage doubler.

4. An adapter circuit, comprising:
   (a) a selective voltage doubler, wherein the selective voltage doubler approximately doubles an input voltage with a low line connector and does not double the input voltage with a high line connector;
   (b) a switcher coupled to the selective voltage doubler;
   (c) a resonant circuit coupled to the switcher;
   (d) a first diode and a second diode coupled to the resonant circuit; and
   (e) a filter coupled to the first and second diodes, wherein the filter comprises:
      (e1) an inductor coupled to the first and second diodes, and
      (e2) a fourth capacitor, wherein a positive terminal of the fourth capacitor is coupled to an output of the inductor and a negative terminal of the fourth capacitor is coupled to ground.

5. An adapter circuit, comprising:
   (a) a selective voltage doubler, wherein the selective voltage doubler approximately doubles an input voltage with a low line connector and does not double the input voltage with a high line connector;
   (b) a switcher coupled to the selective voltage doubler;
   (c) a resonant circuit coupled to the switcher;
   (d) a first diode and a second diode coupled to the resonant circuit;
   (e) a filter coupled to the first and second diodes; and
   (f) an output voltage regulator, wherein the output voltage regulator comprises:
      (f1) an error amplifier coupled to an output of the adapter circuit, and (f2) a voltage control oscillator coupled to the error amplifier, a gate of a first transistor of the switcher, and a gate of a second transistor of the switcher.

6. An adapter circuit, comprising;
(a) a selective voltage doubler, wherein the selective voltage doubler approximately doubles an input voltage with a low line connector and does not double the input voltage with a high line connector, wherein the selective voltage doubler comprises;
   (a1) half-wave rectifier coupled to a first blade and a second blade of the low-line connector or the high-line connector,
   (a2) a first capacitor, wherein a positive terminal of the first capacitor is coupled to the half-wave rectifier and a negative terminal of the first capacitor is coupled to a third blade of the low line connector or the high line connector, wherein the third blade is coupled to the second blade in the low line connector and not coupled to the second blade in the high line connector, and
   (a3) a second capacitor, wherein a positive terminal of the second capacitor is coupled to the negative terminal of the first capacitor and a negative terminal of the second capacitor is coupled to ground;
(b) a switcher couple to the selective voltage doubler, wherein the switcher comprises:
   (b1) a first transistor, wherein a drain of the first transistor is coupled to the positive terminal of the first capacitor, and
   (b2) a second transistor, wherein a drain of the second transistor is coupled to a source of the first transistor and a source of the second transistor is coupled to the negative terminal of the second capacitor;
(c) a resonant circuit coupled to the switcher, wherein the resonant circuit comprises:
   (c1) a third capacitor coupled to the source of the first transistor and to the drain of the second transistor, and
   (c2) a transformer comprising a primary and a secondary winding, wherein the primary winding of the transformer is coupled to the third capacitor and the source of the second transistor;
(d) a first diode and a second diode coupled to the secondary winding of the transformer; and
(e) a filter coupled to the first and second diodes, wherein the filter comprises:
   (e1) an inductor coupled to the first and second diodes, and
   (e2) a fourth capacitor, wherein a positive terminal of the fourth capacitor is coupled to an output of the inductor and a negative terminal of the fourth capacitor is coupled to ground.

7. The circuit of claim 6, further comprising:
(f) an output voltage regulator.

8. The circuit of claim 7, wherein the output voltage regulator (f) comprises:
(f1) an error amplifier coupled to an output of the adapter circuit; and
(f2) a voltage control oscillator coupled to the error amplifier, a gate of the first transistor, and a gate of the second transistor.

9. A system, comprising:
a low line connector, comprising a first blade, a second blade, and a third blade coupled to the second blade; and
an adapter circuit, comprising:
   a selective voltage doubler, wherein the selective voltage doubler approximately doubles an input voltage,
   a switcher coupled to the selective voltage doubler,
   a resonant circuit coupled to the switcher,
   a first diode and a second diode coupled to the resonant circuit,
   wherein the selective voltage doubler comprises:
      a half-wave rectifier coupled to the first blade and the second blade,
      a first capacitor, wherein a positive terminal of the first capacitor is coupled to the half-wave rectifier and a negative terminal of the first capacitor is coupled to the third blade, and
      a second capacitor, wherein a positive terminal of the second capacitor is coupled to the negative terminal of the first capacitor and a negative terminal of the second capacitor is coupled to ground, and a filter coupled to the first and second diodes.

10. The system of claim 9, wherein the switcher comprises:
a first transistor, wherein a drain of the first transistor is coupled to a positive terminal of a first capacitor of the selective voltage doubler; and
a second transistor, wherein a drain of the second transistor is coupled to a source of the first transistor and a source of the second transistor is coupled to a negative terminal of a second capacitor of the selective voltage doubler.

11. A system, comprising:
a low line connector, comprising a first blade, a second blade, and a third blade coupled to the second blade; and
an adapter circuit, comprising:
   a selective voltage doubler, wherein the selective voltage doubler approximately doubles an input voltage,
   a switcher coupled to the selective voltage doubler,
   a resonant circuit coupled to the switcher,
   a first diode and a second diode coupled to the resonant circuit, and
   a filter coupled to the first and second diodes,
   wherein the resonant circuit comprises:
      a third capacitor coupled to a source of a first transistor of the switcher and to a drain of a second transistor of the switcher, and
      a transformer, wherein a primary winding of the transformer is coupled to the third capacitor and a source of the second transistor, wherein a secondary winding of the transformer is coupled to the first and second diodes.

12. A system, comprising:
a low line connector, comprising a first blade, a second blade, and a third blade coupled to the second blade; and
an adapter circuit, comprising:
   a selective voltage doubler, wherein the selective voltage doubler approximately doubles an input voltage,
   a switcher coupled to the selective voltage doubler,
   a resonant circuit coupled to the switcher,
   a first diode and a second diode coupled to the resonant circuit, and
   a filter coupled to the first and second diodes, wherein the filter comprises:
      an inductor coupled to the first and second diodes, and
      a fourth capacitor, wherein a positive terminal of the fourth capacitor is coupled to an output of the inductor and a negative terminal of the fourth capacitor is coupled to ground.

13. An adapter circuit, comprising:
(a) a selective voltage doubler, wherein the selective voltage doubler approximately doubles an input voltage with a low line connector and does not double the input voltage with a high line connector;
(b) a switcher coupled to the selective voltage doubler;
(c) a resonant circuit coupled to the switcher;
(d) a first diode and a second diode coupled to the resonant circuit;
(e) a filter coupled to the first and second diodes; and
(f) an output voltage regulator, wherein the output voltage regulator comprises:
an error amplifier coupled to an output of the adapter circuit, and
a voltage control oscillator coupled to the error amplifier, a gate of a first transistor of the switcher, and a gate of a second transistor of the switcher.

14. A system, comprising:
a high line connector, comprising a first blade, a second blade, and a third blade, wherein the third blade is not coupled to the second blade; and
an adapter circuit, comprising:
a selective voltage doubler, wherein the selective voltage doubler does not double an input voltage,
a switcher coupled to the selective voltage doubler,
a resonant circuit coupled to the switcher,
a first diode and a second diode coupled to the resonant circuit, and
a filter coupled to the first and second diodes.

15. The system of claim 14, wherein the selective voltage doubler comprises:
a half-wave rectifier coupled to a first blade and a second blade;
a first capacitor, wherein a positive terminal of the first capacitor is coupled to the half-wave rectifier and a negative terminal of the first capacitor is coupled to the third blade; and
a second capacitor, wherein a positive terminal of the second capacitor is coupled to the negative terminal of the first capacitor and a negative terminal of the second capacitor is coupled to ground.

16. The system of claim 14, wherein the switcher comprises:
a first transistor, wherein a drain of the first transistor is coupled to a positive terminal of a first capacitor of the selective voltage doubler; and
a second transistor, wherein a drain of the second transistor is coupled to a source of the first transistor and a source of the second transistor is coupled to a negative terminal of a second capacitor of the selective voltage doubler.

17. The system of claim 14, wherein the resonant circuit comprises:
a third capacitor coupled to a source of a first transistor of the switcher and to a drain of a second transistor of the switcher; and
a transformer, wherein a primary winding of the transformer is coupled to the third capacitor and a source of the second transistor, wherein a secondary winding of the transformer is coupled to the first and second diodes.

18. The system of claim 14, wherein the filter comprises:
an inductor coupled to the first and second diodes; and
a fourth capacitor, wherein a positive terminal of the fourth capacitor is coupled to an output of the inductor and a negative terminal of the fourth capacitor is coupled to ground.

19. The system of claim 14, wherein the adapter circuit further comprises:
an output voltage regulator.

20. The system of claim 19, wherein the output voltage regulator comprises:
an error amplifier coupled to an output of the adapter circuit; and
a voltage control oscillator coupled to the error amplifier, a gate of a first transistor of the switcher, and a gate of a second transistor of the switcher.

* * * * *